United States Patent [19]
Hansen et al.

[11] Patent Number: 6,055,117
[45] Date of Patent: Apr. 25, 2000

[54] SYSTEMS AND METHOD HAVING DATA ENCODED WITH EDGE PLACEMENT EQUALIZATION

[75] Inventors: Lawrence A. Hansen, Meridian; Charles B. Gamble, Boise; Ralph F. Simmons, Boise; Michael C. Allyn, Boise, all of Id.

[73] Assignee: Hewlett-Packard Company, Palo Alto, Calif.

[21] Appl. No.: 09/095,005

[22] Filed: Jun. 9, 1998

[51] Int. Cl.[7] .......................................... G11B 5/09
[52] U.S. Cl. .................. 360/45; 360/44; 360/51; 360/48
[58] Field of Search ................... 360/44, 45, 51, 360/48; 369/59; 341/59, 182

[56] References Cited

U.S. PATENT DOCUMENTS 5,047,876  9/1991  Genheimer et al. .
5,165,089  11/1992  Jaquette et al. .
5,335,118  8/1994  Meyer .
5,339,202  8/1994  Heinz et al. .
5,530,600  6/1996  Shrinkle .

Primary Examiner—W. Chris Kim

[57] ABSTRACT

A data recording system includes media such as a magnetic disk or tape, a read/write head assembly, and a circuit that provides a write signal having edge placement equalization. The circuit responds to a binary serial data signal such as a run length limited signal of the type (1,x) and provides a write signal having data transitions corresponding to one of the two binary data values, the absence of a transition corresponding to the other data value. In addition, the write signal is provided with a pair of equalization transitions during periods of no data transitions. A first data transition is shifted away from the last provided equalization transition by a predetermined offset. A second data transition, provided immediately after the first data transition, may be shifted toward the last provided equalization transition. Timing of the data transitions is derived from a clock used to provide the equalization transitions.

20 Claims, 6 Drawing Sheets

SYSTEMS AND METHOD HAVING DATA ENCODED WITH EDGE PLACEMENT EQUALIZATION

FIELD OF THE INVENTION

Embodiments of the present invention relate to systems and methods of the type that provide a signal conveying data by the presence or absence of data transitions in addition to equalization transitions.

BACKGROUND OF THE INVENTION

As an introduction to problems solved by the present invention, consider the conventional tape system used for storage and retrieval of binary data for a computer system. Such a tape system stores digital information as data transitions of magnetic flux on magnetic tape. These data transitions are separated by varying time periods, the ratio between the maximum and minimum time periods varying according to the data recording standard being used. For example, it is conventional to encode serial binary data as a series of time periods known as data bit cells by omitting a data transition from a cell for a binary zero and generating a data transition in a cell for each binary one. Further, the spacing of data transitions is controlled by encoding the binary data according to a standard of the type known as run length limited (RLL). One conventional RLL encoding, {1,7}, calls for a minimum separation of one binary zero between binary ones and a maximum separation of seven binary zeros between binary ones. Consequently, any RLL code designated {1,x} conveys binary bits without the occurrence of consecutive data bit cells each having a data transition. These constraints are easily applied to data to be recorded and greatly simplify detection of the recorded data transitions.

In reading data from a magnetic tape, the tape passes over a read head which provides a signal to circuitry of a read channel that detects a change of flux as a pulse. The amplitude and peak position of the pulse provided by the read channel varies substantially depending on the time period separating one data transition from another and depending on the pattern of data transitions. A read channel which cannot accommodate such variation is considered unreliable because the read channel fails to read recorded data without error. Two common failure modes of a read channel involve: (a) failing to detect a valid data transition when preceded by a comparatively long period of time devoid of data transitions; and (b) failing to detect one of two closely spaced data transitions.

When the time period between data transitions is large, the low frequency response of the read head can make detection of a valid pulse in a subsequent cell less reliable. According to schemes known as "write equalization", an additional pair of equalization transitions is introduced into cells corresponding to a zero data bit. These equalization transitions are placed so as not to be misread as a recorded one data bit. When the pair of equalization transitions is placed symmetrically within the time period of a cell, the write equalization scheme is considered symmetric as opposed to asymmetric.

When the time period between data transitions is short, pulse amplitude peaks are difficult to detect and the time between peaks is slightly increased. Conventional schemes known as "write precompensation" have been designed to perform peak separation by so called peak shift precompensation. Shift is accomplished using a multitap delay line or a shift register. By further separating data transitions during recording, peak shift is reduced and a lower error rate for consecutive cells has been achieved.

In general, a signal having two closely spaced transitions is said to suffer from intersymbol interference (ISI). Because each transition can be modeled by a Lorentzian pulse having a peak amplitude and tapering off-peak amplitudes, ISI can be understood from the superposition of such a pulse for each transition. After superposition, the peaks are separated further in time than without being combined into one signal. The closer the peaks are prior to superposition, the greater the peak shift; which is to say the greater the effect of ISI. Many known techniques have used to avoid ISI, including writing the closely spaced transitions further apart.

Markets served by data recording equipment have for years demanded and will continue to demand further increase in data bit packing density and increased read channel reliability. Further separation of data transitions works against increasing data bit packing density. Without the present invention, considerable expense is expected to be unnecessarily incurred for sophisticated head/media technology and complex read channel circuitry.

In view of the problems described above, the need remains for systems and methods of the type that provide a signal conveying data by the presence or absence of data transitions in addition to equalization transitions and that exhibit higher read channel reliability, higher data bit packing density, and lower cost than known alternative systems.

SUMMARY OF THE INVENTION

A data recording apparatus according to aspects of the present invention includes a support that establishes a spaced relation between a provided medium and a head, and includes a circuit that provides a write signal to the head in response to a data signal received by the data recording apparatus. The write signal selectively affects portions of the medium for data recording, each portion corresponding to a respective cell of the write signal. Each cell has a respective reference time for data transition alignment within the cell. Data transitions are aligned at the reference time when separated from a preceding and a following data transition respectively by more than one cell each having no data transition. A contiguous group of consecutive cells include a first cell having an equalization transition; a second cell having no transition; and a third cell having a data transition substantially displaced from the respective reference time.

By displacing the data transition away from the reference time, the reliability for detecting data transitions improves. In practice a data transition of particular interest is one that is closely spaced to a second data transition. By displacing the first data transition away from the reference time, and for example closer to the second data transition, the effect of ISI operates to make the first and second data transitions easier to detect.

In a variation according to aspects of the present invention, offsetting a data transition from the respective reference time is accomplished in a nonlinear (i.e. pattern dependent) way. By affecting the edge placement only for closely spaced data transitions (i.e. a nonlinear operation on the data), side effects on linear processes are reduced. Introduction and removal of equalization transitions and reliable recovery of a clock signal from the data are essentially linear processes according to aspects of the present invention.

A method for encoding an input signal having sequential input bits, according to the present invention, provides an output signal, having sequential cells. Each cell includes a respective reference time. For each cell, a bit in a first state is to be represented by a data transition and a bit in a second state is to be represented by the absence of a data transition. The method includes providing a timing signal having a period; providing a first equalization transition in a first cell in response to detecting the occurrence of two consecutive bits each in the second state; and, providing a first data transition at an offset from the respective reference time of a second cell in response to detecting the occurrence of a bit in the second state, wherein the offset comprises a period of the timing signal.

Use of the timing signal as opposed to a fixed tapped delay line for specifying the offset facilitates use of such a method with varying speed tape drives where the appropriate delay is not a fixed amount but depends on the current speed of the tape. Use of the timing signal also facilitates the ability to accept interchangeable media among drives of several manufacturers and of several models is simplified, permitting upward compatibility within the tape drive industry.

In one variation of practicing such a method, a common timing signal is used to generate all transitions in the output signal. The resulting simplifications in circuitry and control programming facilitate economic benefits for products that perform such a method.

According to aspects of the present invention, higher cost alternative circuits are avoided. For example, by improving detection of data transitions, a higher signal to noise ratio is accommodated, the cost of complex read channel circuits (e.g. PRML) is avoided, the cost of heads with higher mechanical tolerances and/or narrower gap (or focus) is avoided, higher cost for more accurate positioning systems and head/media systems related to head/media spacing may be avoided (e.g. wider tolerances permissible), and the cost of more sensitive media (e.g. more uniform or higher coercivity) is avoided.

BRIEF DESCRIPTION OF THE DRAWINGS

The preferred exemplary embodiment of the present invention will hereinafter be described in conjunction with the appended drawing wherein.

In each functional block diagram, a broad arrow symbolically represents a group of signals that together signify a binary code. For example, a group of address lines is represented by a broad arrow because a binary address is signified by the signals taken together at an instant in time. A group of signals having no binary coded relationship is shown as a single line with an arrow. A single line between functional blocks represents one or more signals.

In each timing diagram the vertical axis represents binary logic levels and the horizontal axis represents time. The vertical axis is intended to show transitions between binary levels for each logic signal. The voltages corresponding to the logic levels of the various signals are not necessarily identical among the various signals.

DETAILED DESCRIPTION OF THE INVENTION

Intersymbol interference (ISI) is a well known phenomenon of systems that process digital information conveyed by a digital signal having a series of transitions between logic levels expected to occur within predetermined periods of time. A series of data transitions to be recognized by the time position of a respective peak amplitude, may be read erroneously due to operation of ISI that separates in time the peak amplitudes corresponding to closely spaced data transitions. Many such systems have other variables that also affect the time position of signal peaks. These systems are used for data communication and data recording, to name a few applications.

Figure 1:
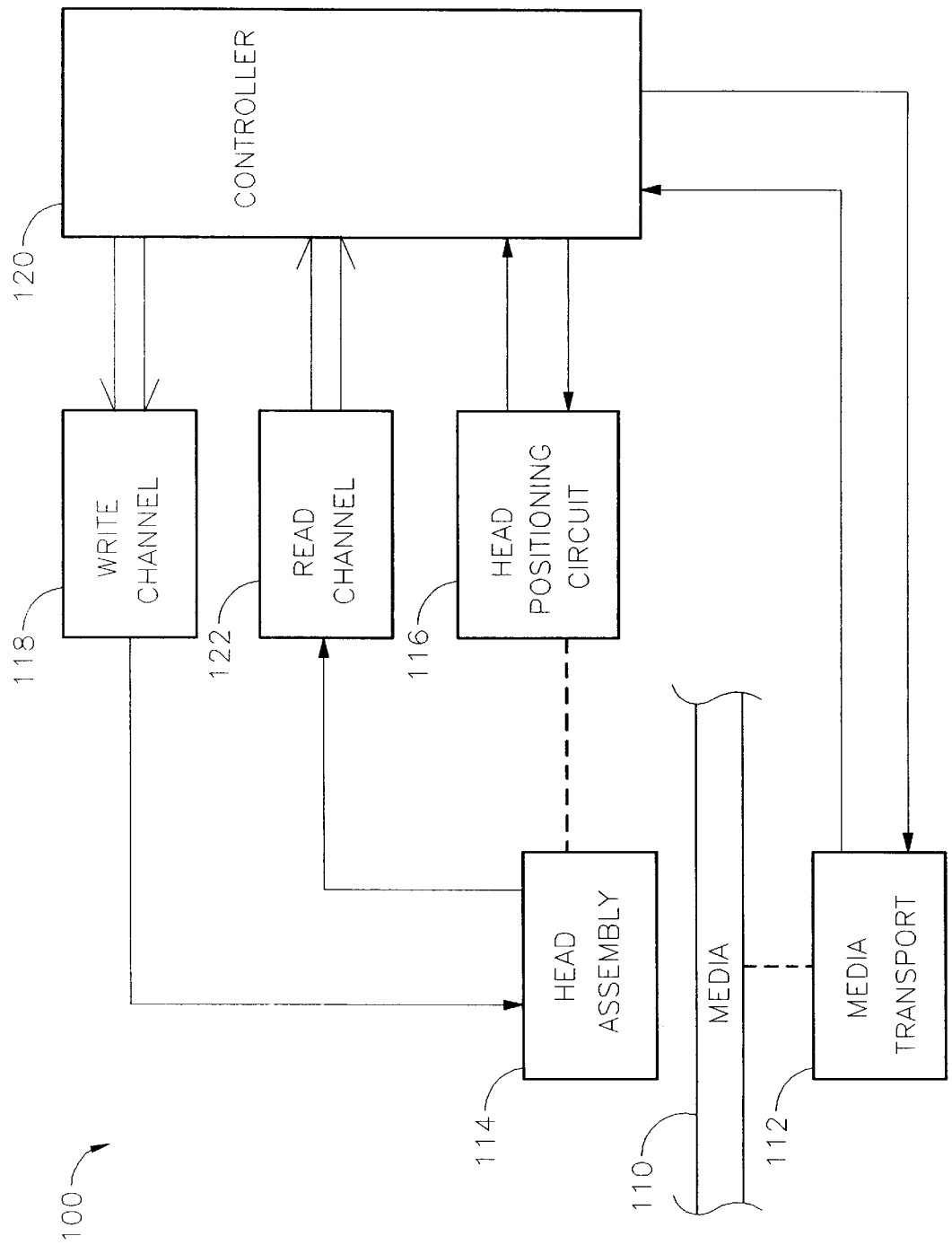
FIG. 1 is a functional block diagram of a data recording apparatus according to one or more aspects of the present invention.

For example, a data recording apparatus 100 of FIG. 1 includes media 110, media transport 112, head assembly 114, head positioning circuit 116, write channel 118, controller 120, and read channel 122. Media 110 includes conventional magnetic and/or optical tape, disk, write-once, and rewritable materials. Media transport 112 cooperates with head assembly 114 for maintaining a selected portion of the media in spaced relation with head assembly 114 for data recording. Media transport 112 provides support for the media and includes one or more conventional motors that respond to control signals from controller 120 and provide status signals (such as RPM, tape speed, rotational index, etc.) to controller 120 for positioning the media. Head assembly 114 includes one or more conventional transducers for effecting recording, erasure, and reading operations; for example, a magnetoresistive (MR) head. Head assembly 114 responds in a conventional manner to write signals from write channel 118 and provides read signals to read channel 122. Head positioning circuit 116 includes conventional electromechanical devices for moving a head with respect to a portion of media 110. Head positioning circuit also includes electronic circuitry for responding to control signals from controller 120 and for providing status signals (such as position, velocity, cylinder, track, etc.) to controller 120. Write channel 118 includes conventional circuit components organized to operate according to aspects of the present invention. Write channel 118 receives data, timing, and control signals from controller 120. Data is to be written as a series of data transitions via head assembly 114. Read channel 122 receives a read signal from head assembly 114 which includes a pulse for each data transition detected from recorded media. Each pulse has a peak amplitude at a position in time. Read channel 122 provides data, timing, and status signals to controller 120. Controller 120 includes conventional digital signal processing circuits which may include discrete logic, memory devices, state machine circuitry, or stored program circuits such as a microcontroller or microprocessor. Methods of the present invention may be partially or completely implemented with coded data or instructions programmed into memory devices according to conventional techniques. In variations of apparatus 100, functions of write channel 118 and controller 120 are shared between write channel 118 and controller 120 according to aspects of the present invention.

In a variation of apparatus 100 according to aspects of the present invention, read channel 122 is omitted with concomitant simplifications in head assembly 114 and controller 120.

Apparatus 100 is representative of systems (e.g. drives) that have fixed or removable media and that write media using any electrostatic, magnetic, thermal, or optical technique. In such apparatus, variables that affect the position in time of each peak amplitude include: physical properties of the media (e.g. dimensions, dimensional variation with ambient conditions, recording surface conditions, coercivity, etc.) accuracy of mechanical alignment and positioning operations, properties of the write and read heads (e.g. frequency and pulse response, pulse width and pulse amplitude response, phase characteristics, energy overwrite characteristics, and physical asymmetries), channel electronics performance parameters (e.g. accuracy and stability of generated signals, amplitude, frequency and phase response of linear circuits, and noise levels in digital circuits, to name a few).

In a variation of apparatus 100 wherein media is interchangeable among drives, the position of signal peaks is affected by additional variables that describe the unit-to-unit differences among units of media, different drives, and different operating conditions when write and read operations are to be performed.

In another variation, apparatus 100 is capable of writing in various modes or various media transport conditions (e.g. start/stop, streaming, varying speed, etc.). In such a case, during read operations, additional variables describe recognition and accommodation of the particular mode that was used during write operations.

Apparatus 100 accommodates many of the above mentioned variables to optimally reduce the number of errors occurring during read operations. In operation, controller 120 directs media transport 112 to position media 110 for data recording (i.e. data storage or writing data). Controller 120 also directs head positioning circuit 116 to position head assembly 114, thereby aligning a portion of media 110 in relation to head assembly 114 for data recording. Controller 120 then provides data signals (for example, a 16K block in 32-bits parallel format) to write channel 118. Write channel 118 converts the parallel format data to serial format, encodes the serial data according to a run length limited standard (e.g. {1,7}) and applies an edge placement equalization process of the present invention to provide a serial data signal to head assembly 114. By applying the edge placement equalization process to the serial data signal, data read through read channel 122 of apparatus 100 (or in another compatible apparatus) is read with a reduced error rate as compared to conventional data recording systems.

An edge placement equalization process according to aspects of the present invention includes any scheme having equalization transitions and selectively placed data transitions conveyed by a write data signal. The write data signal includes contiguous back-to-back time periods called data bit cells. A binary zero is encoded as the absence of a data transition in a respective cell; and, a binary one is conveyed as presence of a data transition at a reference time within a respective cell. The reference time may be any desired time measured from the beginning of the cell, for example the leading cell boundary, the center of the cell, or the trailing cell boundary. The trailing cell boundary, is of course, the leading cell boundary of the next adjacent cell. Cell boundaries and transition placements are made with reference to timing signals; boundaries being marked by the recurring period of a first timing signal (e.g. a data clock) and transitions placed selectively in response to a second timing signal (e.g. a clock phase) having a smaller period equal to an integer fraction (e.g. ⅕) of the first timing signal recurring period. Variations include any ratio of periods of the first to the second timing signals (for example, 4, 5, 6, 7, 10, 20, 50, 100, etc.). Due to the variables discussed above, data transitions intended to be written at the reference time are in fact distributed near the reference time. However, according to aspects of the present invention, data transitions may be written at a substantial displacement (i.e. an offset) from the reference time, for example, by writing at other than a current expectation of the reference time.

Figure 2:
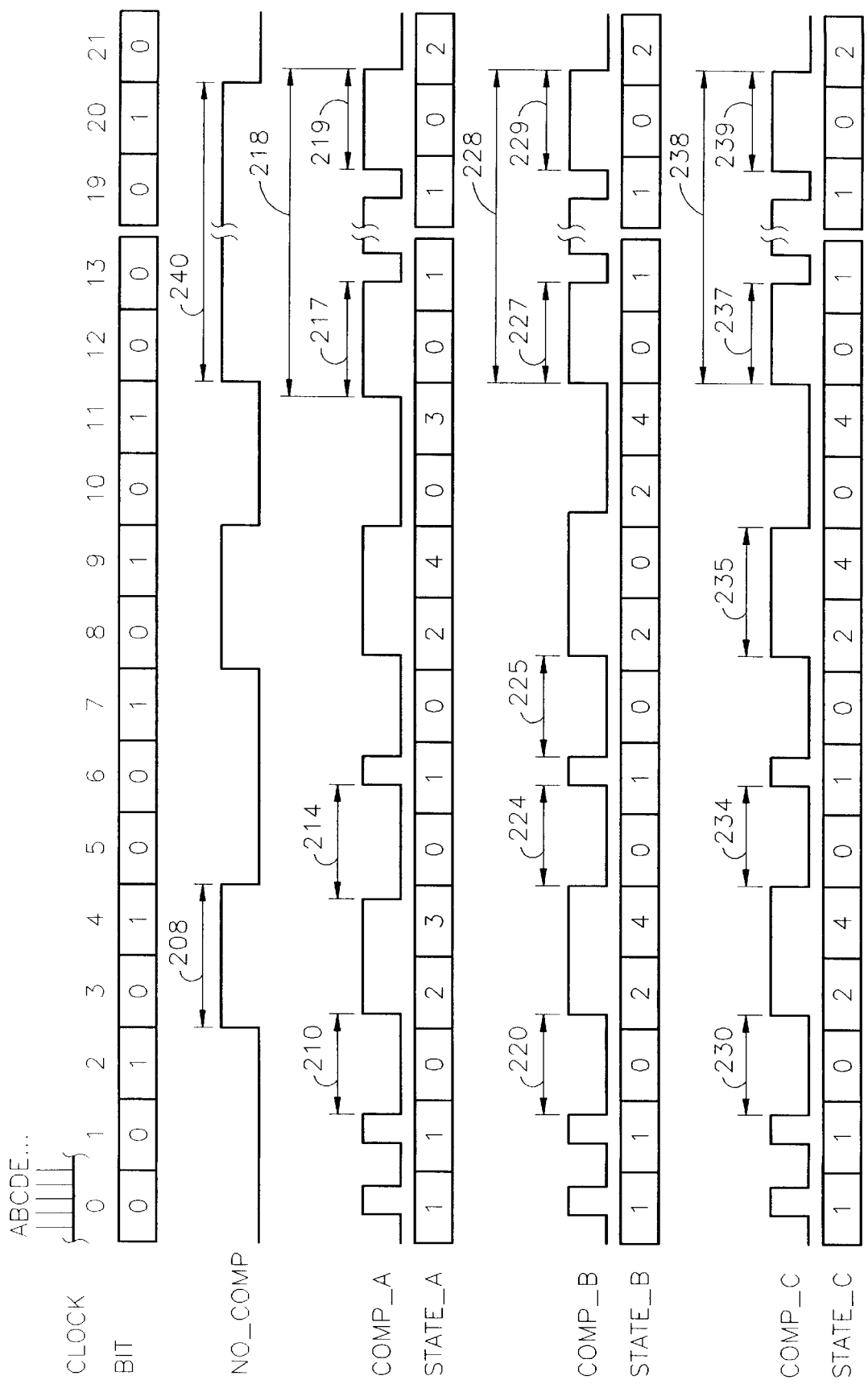
FIG. 2 is a timing diagram illustrating edge placement equalization schemes of the present invention for data transitions in 2T relation.
Figure 3:
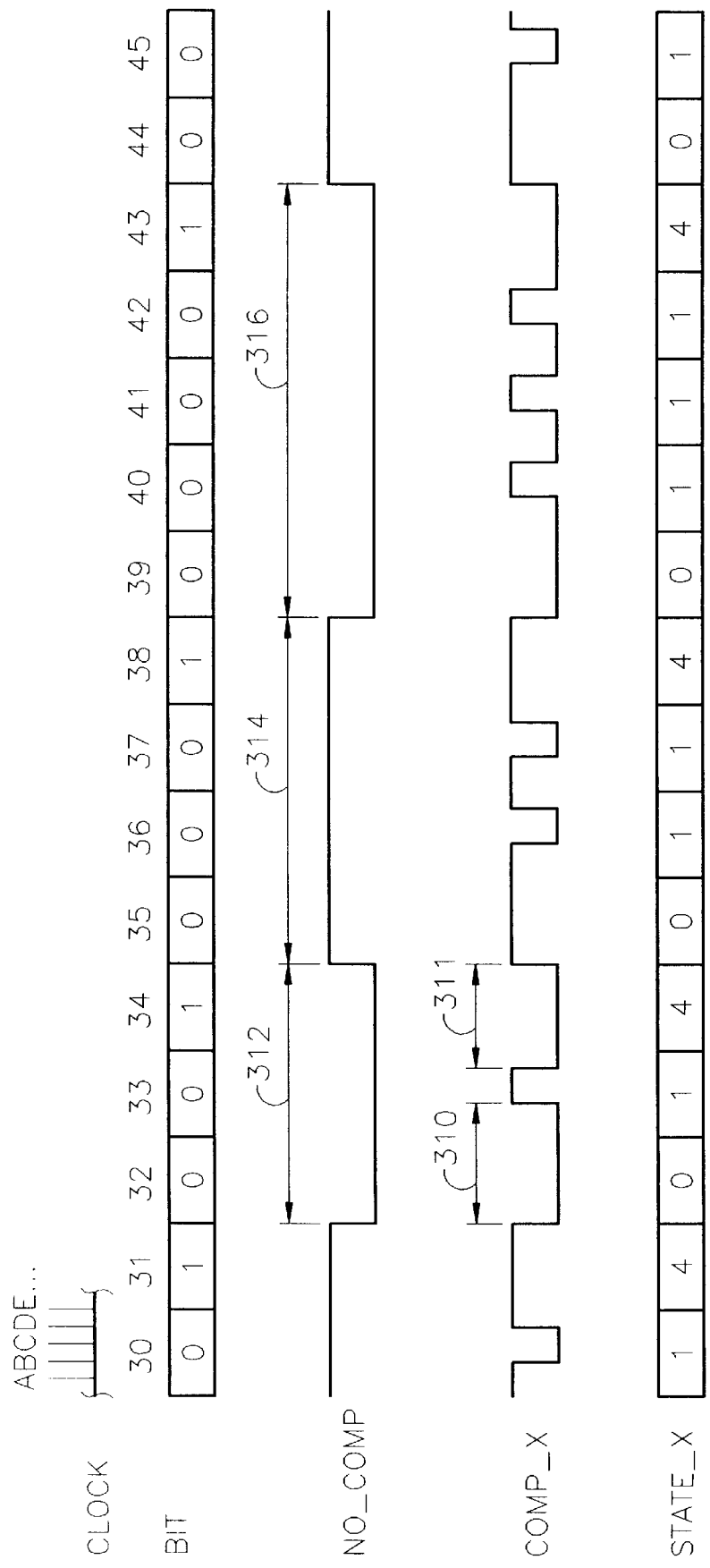
FIG. 3 is a timing diagram illustrating edge placement equalization schemes of the present invention for data transitions in 3T, 4T, and 5T relation.

An edge placement equalization scheme according to aspects of the present invention includes any scheme that provides data transition placements substantially displaced from the respective reference time for selected data patterns. For example, a run length limited code of the form {1,7} will have data transition spacings at a minimum of two periods of the data clock (in so-called 2T relationship) to a maximum of eight periods of the data clock (in so-called 8T) relationship. In FIGS. 2 and 3, signal NO_COMP illustrates a data signal without equalization having data transitions aligned at a reference time defined by the trailing cell boundary. These data transitions are in 2T relation at 208, in 3T relation at 312, in 4T relation at 314, in 5T relation at 316, and in 8T relation at 240. According to an aspect of the present invention, data transitions in 2T relation are substantially displaced from the respective reference time. In a preferred embodiment, only data transitions in 2T relation are selectively displaced.

In FIGS. 2 and 3, signal CLOCK has five active edges identified by letters A through E in every cell. Cells are identified by BIT positions 1 through 20 in FIG. 2 and BIT positions 30 through 45 in FIG. 3. The binary value of the data bit to be conveyed by a write data signal is defined for each BIT as 0 or 1.

Four comprehensive signals COMP_A, COMP_B, COMP_C, and COMP_X are shown in relation to BIT cells to illustrate edge position equalization according to aspects of the present invention. In the above four comprehensive signals, equalization transitions are provided when the immediately prior BIT cell is 0 and the current BIT cell is also 0. Equalization transitions are provided in response to CLOCK active edges B and D.

In the edge placement equalization scheme of signal COMP_A, the leading data transition in a 2T relation (as in response to BIT positions 2, 7, and 20) is clocked in response to CLOCK A of the following cell. In other words, when a leading data transition in a 2T relation is to be provided, that data transition is provided at a time substantially displaced from the reference time, for example, delayed one period of signal CLOCK from the reference time. In addition, the trailing data transition in a 2T relation is clocked in response to CLOCK D of the current cell (as in response to BIT position 4). However, when BIT values provide three or more data transitions in 2T relation (as in BIT positions 7, 9, and 11), data transitions are provided at the reference time (as in BIT position 9) except for the leading data transition (in response to BIT position 7) and the trailing data transition (in response to BIT position 11). The leading and trailing data transitions for three or more data transitions in 2T relation are provided as described above for data transitions in response to BIT positions 2 and 4 respectively. For data transitions in any relation greater than 2T, leading and trailing data transitions are provided at the reference time (as for signal COMP_X in response to BIT positions 31, 34, 38, and 43). Particular benefits of this scheme are discussed following the discussion of signals COMP_B and COMP_C below.

In the alternate edge placement scheme of signal COMP_B, the leading data transition in a 2T relation (as in response to BIT positions 2, 7, 9, and 20) is clocked in response to CLOCK A of the following cell regardless of whether other data transitions follow in subsequent 2T relation. In other words, for every leading data transition in a 2T relation to be provided, that data transition is provided at a time substantially displaced from the reference time, for example, delayed one period of signal CLOCK from the reference time. The trailing data transition in a 2T relation (as in response to BIT position 9) is also clocked in response to CLOCK A of the following cell; except when the next occurring data transition is more than 2T away (as in response to BIT positions 4 and 11). For data transitions in any relation greater than 2T, leading and trailing data transitions are provided at the reference time (as for signal COMP_X in response to BIT positions 31, 34, 38, and 43). Particular benefits of this scheme are discussed following the discussion of signal COMP_C below.

In the alternate edge placement scheme of signal COMP_C, the leading data transition in a 2T relation (as in response to BIT positions 2, 7, and 20) is clocked in response to CLOCK A of the following cell. Without exception, the trailing data transition in a 2T relation is clocked at the reference time in response to CLOCK E of the current cell (as in response to BIT position 4, 9, and 11). For data transitions in any relation greater than 2T, leading and trailing data transitions are provided at the reference time (as for signal COMP_X in response to BIT positions 31, 34, 38, and 43).

Use of edge placement equalization as described for example with reference to signals COMP_A, COMP_B, COMP_C, and COMP_X, reduces the error rate on reading recorded data and facilitates system optimization. For example, data transitions in response to BIT positions 2 and 4 are provided closer together than provided on the NO_COMP signal. A corresponding read data signal has a peak for each transition at a time shifted by the effect of ISI back toward the respective reference time for each peak. In addition, a read data clock signal derived from recorded transitions has improved timing accuracy for aligning an active edge at each expected reference time.

Applicants have found that optimization analysis may be simplified. Such an optimization is responsive to any combination of one or more variables discussed with reference to FIG. 1. The simplification leads to further performance improvements in read and write channel design while maintaining cost targets, improving data bit packing density, and increasing reliability, especially for operation involving interchangeable media. Two nonlinearities of edge placement equalization schemes cooperate to provide a signal that is amenable to linear approximation for optimization purposes. For example, in a preferred scheme, the introduction of equalization transitions in cells having no data transition is carried out in a pattern dependent way in that no equalization transition is introduced into a 2T pattern. Further, the introduction of a substantial displacement of data transitions is also carried out in a pattern dependent way in that only data transitions in 2T relation are considered and consecutive 2T patterns may be exempted. In general, accounting for pattern dependent equalization (also called nonlinear equalization) complicates analysis for system optimization. However, applicants have found that the combined effect of these two nonlinear aspects facilitates optimization based on linear analysis techniques because appropriate linear approximations can be applied without loss of accuracy.

The timing accuracy of a read data clock may be adversely affected by asymmetric time periods adjacent to data transitions in 2T relation. These time periods are conveniently expressed by the quantity of periods of signal CLOCK. For example, signal COMP_A includes time periods 210 and 214 in asymmetric 7:8 relation and time periods 217 and 219 in asymmetric 7:8 relation. Signal COMP_X, however includes representative time periods 310 and 311 in 7:6 relation. Edge position equalization schemes having asymmetric time periods may be optimal for some systems where, for example, errors in the recognition of data transitions in 2T relationship can be addressed by aggressive edge placement with less regard to read clock timing accuracy.

On the other hand, in systems where read clock timing accuracy plays a significant role in reducing errors in the recognition of data transitions in 2T relationship, use of symmetric time periods may lead to desired optimization. For example, in the scheme of COMP_B and COMP_C, periods of equal duration are provided as represented by periods 220, 224, 227, 229; and 230, 234, 237, and 239.

The timing accuracy of a read data clock may also be adversely affected by extended time periods devoid of data transitions. For example, an 8T spacing provides little feedback information in a conventional phase-locked or frequency-locked read data clock recovery circuit for a period of eight periods of the read data clock. In some systems the read data clock is expected to vary, for example in variable speed tape drives. Whether or not the read data clock is expected to vary, maintaining synchronism between the read data clock and the read data signal having data transitions to be clocked is simplified when data transitions appear in regular spaced relation to each other.

As an example of the effect of edge placement equalization on read data clock timing accuracy, consider an 8T space between the trailing data transition of a 2T pair (as in response to BIT position 11) and the leading data transition of a subsequent 2T pair (as in response to BIT position 20). An extended time period devoid of data transitions may have a duration that, when affected by ISI provides a desirable system optimization. According to the scheme represented by signal COMP_A, duration 218 may be beneficially affected by ISI so that the 8T spacing as increased by edge placement equalization actually does not materially compromise read data clock timing accuracy. According to the scheme represented by signals COMP_B and COMP_C, read clock timing accuracy is less affected because only one of the two data transitions bounding the 8T spacing is displaced from its respective reference time.

The timing accuracy of a read data clock may be optimized further by selecting between the schemes represented by signals COMP_B and COMP_C. In the preferred scheme of signal COMP_B, a long string of 2T spacings may have the effect of advancing the read data clock phase slightly in time. In the scheme of signal COMP_C, however, all except the first data transition are provided at the reference time to reduce the possibility of advancing the read data clock phase.

Practice of an embodiment of the invention may account for several considerations including system level error rate, signal to noise ratios, and (within the context of integrated circuitry) the maximum clock frequency for the semiconductor process technology involved, mechanical variables, circuit and firmware complexity variables, and data encoding rules. For example, the RLL code parameters may have any value; and, the maximum number of consecutive 2T spacings may be controlled. The extent of displacement from the reference time, expressed as a percent of cell duration, may vary from 0 to about 50%, preferably between 10% and 25%, and most preferably about 20%. The extent of displacement may be determined by an asynchronous or a synchronous process with respect to a period of a timing signal derived from an oscillator. In a synchronous process, the physical dimension of the portion of media affected by transitions in a cell is preferably related to the timing signal used to determine the extent of displacement. When the cooperation of the media transport and the head assembly results in a varying amount of media exposed to the head per unit time, preferably a timing signal is used to define cell boundaries to maintain a uniform bit packing density on the media. In such a system, edge placement within a cell may be responsive to status signals from the media transport and/or head positioning circuit and may also (or alternatively) be responsive to a reference timing signal prerecorded on the media.

For example, in a tape drive designed according to preferred aspects of the present invention, signal CLOCK has a rate of 150 Mhz. Equalization transitions are formed in a ⅔ths asymmetric late relation to the cell boundary. A 2T spacing in such a system is approximately 66 nanoseconds. Using a run length limited {1,7} code, a data transition selected for being displaced from the reference time (the cell boundary) is displaced using signal CLOCK. The displacement is therefore, 20% of the cell duration. The write and read channel include a band pass filter response having corner frequencies of 3.75 Mhz and 11 Mhz to suppress equalization transitions. The adverse peak shift effect of ISI is reduced dramatically for 2T spacings with little loss of read clock timing accuracy. For example, a peak to RMS signal to noise ratio as low as 25 dB accommodates an error rate of less than 1 error in 1 trillion bits processed. Particularly, at the same signal to noise ratio, the use of edge placement equalization and RLL {1,7} encoding allowed greater bit packing density than without edge placement equalization and RLL {2,7}. Further, the data rate to symbol rate for RLL {1,7} is better than that for RLL {2,7}.

Optimization, as discussed above, may be based on a model of a portion of the system, and preferably a portion that includes all mechanical and signal processing features (including interchangability of media, for example) between the source of digital data to be recorded or sent and the recipient of data as read or received so that an error analysis can be made between representations of the data being processed through the system as a whole. Such a model may preferably include both linear and nonlinear transfer functions. It is an advantage of the present invention that edge placement equalization as described by the above examples exhibits nearly linear operations on the data, allowing some of the model to be simplified.

Circuits of the present invention and circuits capable of performing methods according to various aspects of the present invention include any logic circuit that performs sequential operations including combinatorial digital logic circuits, integrated digital or combined analog and digital circuits, and programmed sequential processors. For example, an analysis of the timing features of signal COMP_A is provided on FIG. 2 as a sequence STATE_A. Each state has an integer value from 0 to 4 and corresponds to a cell having a position identified above the BIT cell in FIGS. 2 and 3. Likewise, sequence STATE_B, STATE_C, and STATE_X respectively provide a corresponding analysis of signals COMP_B, COMP_C, and COMP_X. Circuits that operate according to various aspects of the present invention may be developed from the selected sequence as desired using conventional circuit design techniques.

Figure 5:
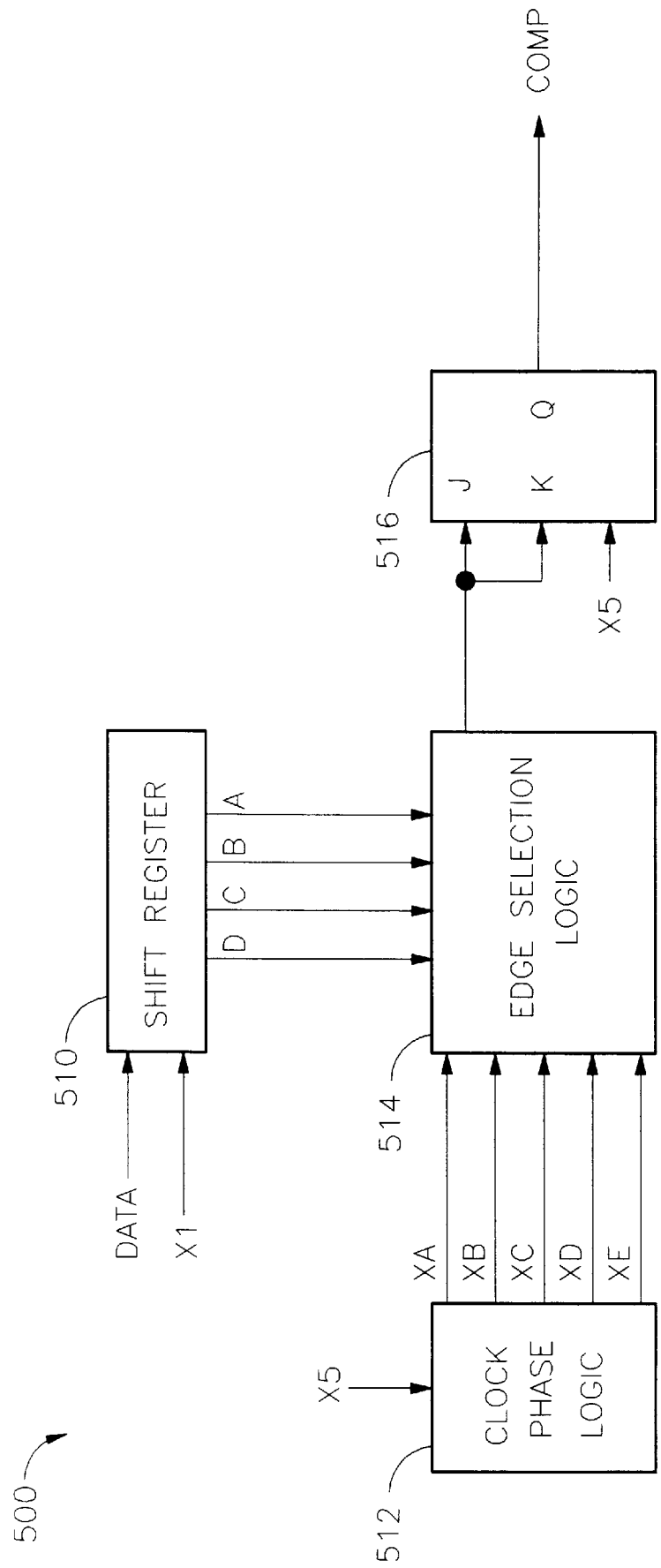
FIG. 5 is a functional block diagram for another variation of a portion of write channel 118 of FIG. 1.
Figure 6:
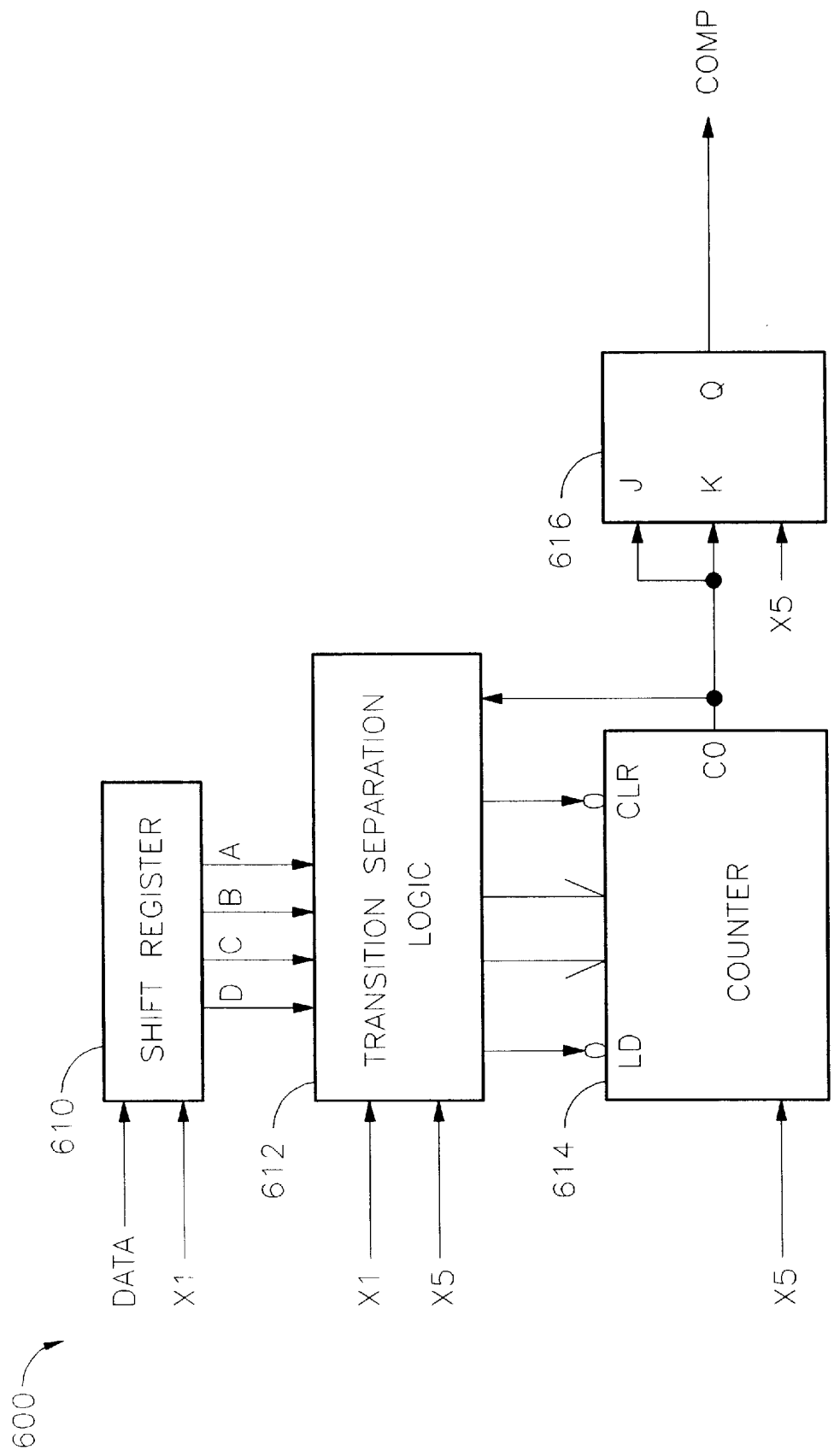
FIG. 6 is a functional block diagram for yet another variation of a portion of write channel 118 of FIG. 1.

State transitions are described in Tables 1 through 3. In each table, an entry is made in the column marked "JK" which describes a signal that will cause a JK flip flop to generate at its Q output the respective comprehensive signal (COMP_A, COMP_B, COMP_C, or COMP_X). Such a flip flop is toggled in response to signal CLOCK. In each table the "Condition" for a state transition is described with letters A, B, C, and D which correspond to the cell values at positions that are, respectively, 4, 3, 2, and 1 position ahead of the current cell. The value at the identified position for the condition to be satisfied is subscripted as a 0 or 1. The letter designations are consistent with similarly named outputs of shift register 410, 510, and 610 in FIGS. 4, 5, and 6.

TABLE 1

COMP_A 7:8

| Reference BIT Positions | Current STATE_A | JK for COMP_A | Condition | Next STATE_A |
|---|---|---|---|---|
| 0–1 | 1 | 00110 | $B_0$ | 1 |
| 1–2 | 1 | 00110 | $B_1$ | 0 |
| 2–3 | 0 | 00000 | $A_1C_1$ | 2 |
| 3–4 | 2 | 10000 | $D_0$ | 3 |
| 4–5 | 3 | 00010 | none | 0 |
| 5–6 | 0 | 00000 | $A_0B_0$ | 1 |
| 6–7 | 1 | 00110 | $B_1$ | 0 |
| 7–8 | 0 | 00000 | $A_1C_1$ | 2 |
| 8–9 | 2 | 10000 | $D_1$ | 4 |
| 9–10 | 4 | 00001 | none | 0 |
| 10–11 | 0 | 00000 | $A_0B_1$ | 3 |
| 11–12 | 3 | 00010 | none | 0 |
| 12–13 | 0 | 00000 | $A_0B_0$ | 1 |
| 13–14 | 1 | 00110 | $B_0$ | 1 |
| 19–20 | 1 | 00110 | $B_1$ | 0 |
| 20–21 | 0 | 00000 | $A_1C_1$ | 2 |

TABLE 2

COMP_B 7:7

| Reference BIT Positions | Current STATE_B | JK for COMP_B | Condition | Next STATE_B |
|---|---|---|---|---|
| 0–1 | 1 | 00110 | $B_0$ | 1 |
| 1–2 | 1 | 00110 | $B_1$ | 0 |
| 2–3 | 0 | 00000 | $A_1C_1$ | 2 |
| 3–4 | 2 | 10000 | $D_0$ | 4 |
| 4–5 | 4 | 00001 | none | 0 |
| 5–6 | 0 | 00000 | $A_0B_0$ | 1 |
| 6–7 | 1 | 00110 | $B_1$ | 0 |
| 7–8 | 0 | 00000 | $A_1C_1$ | 2 |
| 8–9 | 2 | 10000 | $D_1$ | 0 |
| 9–10 | 0 | 00000 | $A_1B_0$ | 2 |
| 10–11 | 2 | 10000 | $D_0$ | 4 |
| 11–12 | 4 | 00001 | none | 0 |
| 12–13 | 0 | 00000 | $A_0B_0$ | 1 |
| 13–14 | 1 | 00110 | $B_0$ | 1 |
| 19–20 | 1 | 00110 | $B_1$ | 0 |
| 20–21 | 0 | 00000 | $A_1C_1$ | 2 |

TABLE 3

COMP_C 7:7

| Reference BIT Positions | Current STATE_C | JK for COMP_C | Condition | Next STATE_C |
|---|---|---|---|---|
| 0–1 | 1 | 00110 | $B_0$ | 1 |
| 1–2 | 1 | 00110 | $B_1$ | 0 |
| 2–3 | 0 | 00000 | $A_1C_1$ | 2 |
| 3–4 | 2 | 10000 | none | 4 |
| 4–5 | 4 | 00001 | none | 0 |
| 5–6 | 0 | 00000 | $A_0B_0$ | 1 |
| 6–7 | 1 | 00110 | $B_1$ | 0 |

TABLE 3-continued

COMP_C 7:7

| Reference BIT Positions | Current STATE_C | JK for COMP_C | Condition | Next STATE_C |
|---|---|---|---|---|
| 7–8 | 0 | 00000 | $A_1C_1$ | 2 |
| 8–9 | 2 | 10000 | none | 4 |
| 9–10 | 4 | 00001 | none | 0 |
| 10–11 | 0 | 00000 | $D_0$ | 4 |
| 11–12 | 4 | 00001 | none | 0 |
| 12–13 | 0 | 00000 | $A_0B_0$ | 1 |
| 13–14 | 1 | 00110 | $B_0$ | 1 |
| 19–20 | 1 | 00110 | $B_1$ | 0 |
| 20–21 | 0 | 00000 | $A_1C_1$ | 2 |

TABLE 4

COMP_X

| Reference BIT Positions | Current STATE_X | JK for COMP_X | Condition | Next STATE_X |
|---|---|---|---|---|
| 30–31 | 1 | 00110 | $B_1$ | 4 |
| 31–32 | 4 | 00001 | none | 0 |
| 32–33 | 0 | 00000 | $A_0B_0$ | 1 |
| 36–37 | 1 | 00110 | $B_0$ | 1 |

A state machine is a circuit that responds to a clock signal to determine the state of a memory device, usually for providing an output signal with reference to a state (or contents) of the memory device. Using conventional design technique a state machine design implements a finite description of a digital output signal (for example, a timing diagram) by minimizing the number of states.

Various architectures for state machines may be used to implement an edge placement equalization scheme, for example, as described in FIGS. 2 and 3. For instance, circuit 400 is a state machine responsive to state feedback, circuit 500 is a state machine having a one bit memory device that toggles between two states, and circuit 600 is a state machine having some memory devices arranged for incrementing a preset binary count. Each of these circuits 400, 500, and 600 may implement one or more functional blocks (or the control circuit, not shown) as a minor state machine.

Figure 4:
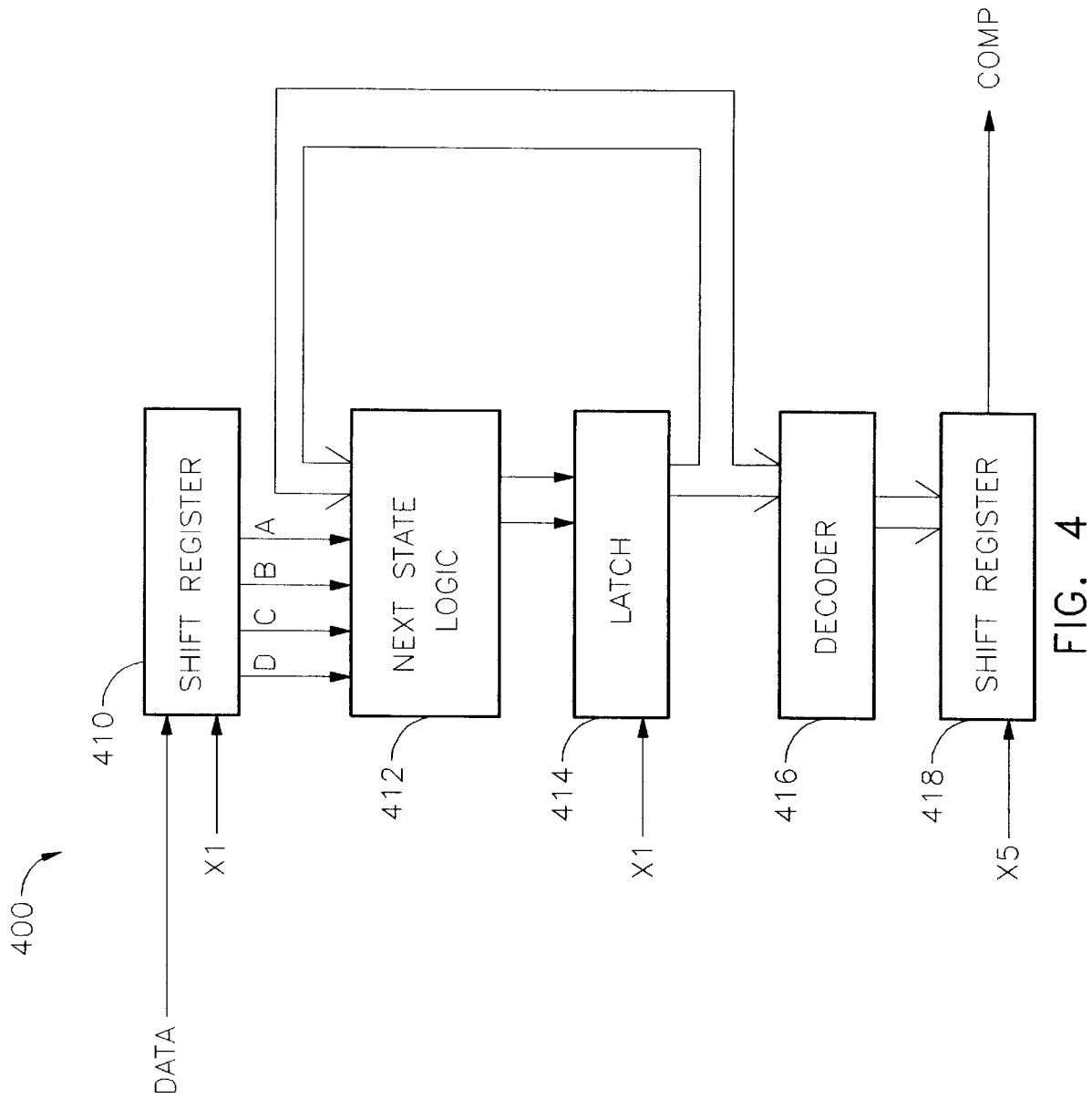
FIG. 4 is a functional block diagram for one variation of a portion of write channel 118 of FIG. 1.

Circuit 400 of FIG. 4 responds to a serial input data signal and provides a serial output signal according to a one or more edge placement equalization schemes. Signal DATA, a serial input data signal, conveys values for example as described by BIT cell values and may include an RLL and an NRZ or NRZI encoding. Signal COMP conveys equalization transitions and data transitions as discussed above for example as signal COMP_A, COMP_B, or COMP_C. Circuit 400 also receives two timing signals: clock signal X1 at the BIT cell rate; and, clock signal X5 at five times the BIT cell rate.

Circuit 400 primarily includes shift register 410, next state logic 412, latch 414, decoder 416, and shift register 418, all assembled with conventional digital logic technology. Low level logic control circuitry and signals have been omitted for clarity. Shift register 410 right-shifts cell values in response to clock X1 to provide output signals D, C, B, and A. Latch 414, clocked for each cell by clock signal X1, provides the current state to decoder 416 and to next state logic 412. Decoder 416 provides the number of bits necessary to enable shift register 418 to provide output signal COMP with the desired equalization transitions and data transitions responsive to clock signal X5. Next state logic may include discrete logic, integrated logic, and programmable logic to implement the state transitions described in one or more of Tables 1 through 3, as desired. Next state logic responds to current state signals provided by latch 414 to implement complex edge placement equalization schemes involving for example, recursion and repetition.

Circuit 500 provides signal COMP in response to signal DATA, these signals being as described with reference to FIG. 4. Circuit 500 primarily includes shift register 510, clock phase logic 512, edge selection logic 514, and toggle flip flop 516. Low level logic control circuitry and signals have been omitted for clarity. Shift register 410 right-shifts cell values in response to clock X1 to provide output signals D, C, B, and A. Clock phase generator 512 provides a signal corresponding to each active edge (A through E) of clock signal X5. Edge selection logic selects the appropriate active edge signals XA through XE to provide the desired equalization transitions and data transitions to flip flop 516. Edge selection logic 514 may include discrete logic, integrated logic, and programmable logic to implement selected outputs defined in FIGS. 2 and 3. Flip flop 516 provides each transition responsive to clock signal X5 for the selected one or more clock edges identified by edge selection logic 514 on output signal COMP according to the desired edge placement equalization schemes. Circuit 500 is preferred for simplicity over circuit 400 for simple edge placement equalization schemes.

Edge placement equalization schemes as discussed above are implemented in another variation designed to provide the next transition (either an equalization transition or a data transition) a selected number of periods of a timing signal after a previous transition. With this architectural approach, simple edge placement equalization schemes may be implemented with a minimum of circuitry. For example, circuit 600 provides signal COMP in response to signal DATA, these signals being as described with reference to FIG. 4. Circuit 600 primarily includes shift register 610, transition separation logic 612, counter 614, gate 615, and toggle flip flop 616. Transition separation logic responds to values in subsequent cells of the write data signal to load counter 614 with a integer value. The value is reloaded in response to clock signal X1 for each BIT position value received on signal DATA. Counter 614 decrements the loaded value to selectively provide carry out signal CO to toggle flip flop 616. When signal CO is provided, a transition on signal COMP is provided by flip flop 616 in response to clock signal X5. If more than one transition is needed per cell, transition separation logic 612 enables via AND gate 615 clearing of counter 614 in response to signal CO. Integer values to be loaded are determined by analysis from FIGS. 2 and 3 with reference to Tables 1 through 3.

The foregoing description discusses preferred embodiments of the present invention, which may be changed or modified without departing from the scope of the present invention. For example, in variations according to beneficial aspects of the present invention, the quantity and placement of equalization transitions varies from the ⅔ths asymmetric late equalization scheme described above. Further, in a system having a variable data rate (e.g. a tape drive for variable speed streaming), it may be desirable to practice a first form of edge placement equalization (e.g. COMP_C with COMP_X) at a first data rate and a second form at another data rate (e.g. COMP_A with COMP_X, COMP_X for all data transition spacings, or NO_COMP). Still further, clock signals of a wide variety of ratios may be used in place of signals X1 and X5 to implement with greater precision a desired variation of edge placement equalization. Edge placement equalization schemes have been described above for data storage systems. In variations of the present invention, data communication using edge placement equalization realizes advantages in systems optimization for systems with various channel electronics including for example data communication between circuits, between computers, between systems, and between signal repeaters, to name a few representative applications.

These and other changes and modifications are intended to be included within the scope of the present invention. While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure to one of ordinary skill in the art to which the invention applies.

The words and phrases used in the claims are intended to be broadly construed. A "system" refers generally to electrical, electronic, and electromechanical apparatus, combinations thereof and equivalents. A "signal" refers to mechanical and/or electromagnetic energy conveying information. When elements are coupled, a signal can be conveyed in any manner feasible in light of the nature of the coupling. For example, if several electrical conductors couple two elements, then the relevant signal comprises the energy on one, some, or all conductors at a given time or time period. When a physical property of a signal has a quantitative measure and the property is used by design to control or communicate information, then the signal is said to be characterized by having a "value." The amplitude may be instantaneous or an average. For a binary (digital) signal, the two characteristic values are called logic levels or states.

What is claimed is:

1. A data recording apparatus responsive to a data signal, the apparatus comprising:
   a. a support that establishes a spaced relation between a provided medium and a head; and
   b. circuit that provides a write signal to the head in response to the data signal, the write signal for selectively affecting portions of the medium for data recording, each portion corresponding to a respective cell of the write signal, wherein:
      (1) each cell has a respective reference time for data transition alignment within the cell, a data transition being aligned at the reference time when separated from a preceding and a following data transition respectively by more than one cell each having no data transition; and
      (2) a contiguous group of consecutive cells comprise:
         (a) a first cell having an equalization transition;
         (b) a second cell having no transition; and
         (c) a third cell having a data transition substantially displaced from the respective reference time.

2. The data recording apparatus of claim 1 wherein the first cell precedes the second cell, and the second cell precedes the third cell.

3. The data recording apparatus of claim 1 wherein the third cell precedes the second cell, and the second cell precedes the first cell.

4. The data recording apparatus of claim 1 wherein each cell has a uniform duration, and the equalization transition of the first cell is separated from the data transition of the third cell by more than 1.1 times the duration.

5. The data recording apparatus of claim 1 wherein the data transition of the third cell is displaced away from the equalization transition.

6. The data recording apparatus of claim 1 wherein:
   a. the circuit further provides a timing signal having a plurality of edges within each cell;
   b. the data transition of the third cell is responsive to a first edge of the plurality; and
   c. the equalization transition is responsive to a second edge of the plurality.

7. The data recording apparatus of claim 1 wherein:
   a. the circuit further provides a timing signal having a period; and
   b. the displacement of the data transition of the third cell comprises a period of the timing signal.

8. The data recording apparatus of claim 1 wherein the group further comprises:
   a. a fourth cell having no data transition; and
   b. a fifth cell having a data transition at the reference time.

9. The data recording apparatus of claim 8 wherein the group further comprises a sixth cell having a data transition substantially displaced from the respective reference time.

10. The data recording apparatus of claim 9 wherein the data transition of the sixth cell is displaced toward the data transition of the third cell.

11. The data recording apparatus of claim 10 wherein the displacement of the third cell and the displacement of the sixth cell are substantially equal.

12. The data recording apparatus of claim 1 wherein the group further comprises a fourth cell having a data transition substantially displaced from the respective reference time.

13. The data recording apparatus of claim 12 wherein the data transition of the fourth cell is displaced toward the data transition of the third cell.

14. The data recording apparatus of claim 1 wherein the data signal conveys a run length limited code without consecutive cells each having a data transition.

15. The data recording apparatus of claim 1 further comprising the provided media wherein the media is non-removable.

16. A method for encoding an input signal to provide an output signal, the input signal comprising sequential input bits, the output signal comprising sequential cells, each cell comprising a respective reference time, wherein for each cell, a bit in a first state is to be represented by a data transition and a bit in a second state is to be represented by the absence of a data transition, the method comprising:
   providing a timing signal having a period between consecutive active edges;
   providing, in response to a first active edge, a first equalization transition in a first cell in further response to detecting the occurrence of two consecutive bits each in the second state; and
   providing, in response to a second active edge, a first data transition at an offset from the respective reference time of a second cell in further response to detecting the occurrence of a bit in the second state, wherein the offset comprises a period of the timing signal.

17. The method of claim 16 wherein introduction of the offset increases a time between the first equalization transition and the first data transition.

18. The method of claim 16 further comprising providing a second data transition following the first data transition, there being an absence of data transitions and equalization transitions between the first data transition and the second data transition, wherein the second data transition is provided at the respective reference time of a third cell.

19. A circuit that receives a data signal, comprising a series of bits, and provides an output signal responsive to the data signal and according to an asymmetric write equalization scheme, the circuit comprising: a state machine for providing the output signal, the output signal comprising in sequence:

a. a first write equalization transition;

b. first data transition a predetermined integer number of periods of a clock signal after the first write equalization transition;

c. a second data transition; and d. a second write equalization transition the predetermined integer number of periods of the clock signal after the second data transition.

20. The circuit of claim 19 wherein the data signal provides the series of bits at a varying bit rate and the period of the clock signal varies in response to the rate.

* * * * *